United States Patent
Amer

(10) Patent No.: US 9,933,535 B2
(45) Date of Patent: Apr. 3, 2018

(54) DETERMINING A FRACTURE TYPE USING STRESS ANALYSIS

(71) Applicant: Schlumberger Technology Corporation, Sugar Land, TX (US)

(72) Inventor: Aimen Hussein Amer, Ahmadi (KW)

(73) Assignee: Schlumberger Technology Corporation, Sugar Land, TX (US)

( * ) Notice: Subject to any disclaimer, the term of this patent is extended or adjusted under 35 U.S.C. 154(b) by 448 days.

(21) Appl. No.: 14/644,693

(22) Filed: Mar. 11, 2015

(65) Prior Publication Data

US 2016/0266268 A1    Sep. 15, 2016

(51) Int. Cl.
*G01V 1/30* (2006.01)
*G01V 1/28* (2006.01)

(52) U.S. Cl.
CPC .............. *G01V 1/30* (2013.01); *G01V 1/282* (2013.01); *G01V 2210/646* (2013.01); *G01V 2210/66* (2013.01)

(58) Field of Classification Search
CPC .......... G01V 1/30; G01V 1/282; G01V 1/301; G01V 2210/646; G01V 2210/66
USPC ........................................................ 367/25
See application file for complete search history.

(56) References Cited

U.S. PATENT DOCUMENTS

| | | | |
|---|---|---|---|
| 5,953,680 A | 9/1999 | Divies et al. | |
| 7,630,865 B2 | 12/2009 | Berkovitch et al. | |
| 7,777,606 B2 | 8/2010 | Akbar et al. | |
| 8,577,660 B2 | 11/2013 | Wendt et al. | |
| 8,600,716 B2 | 12/2013 | Bradford | |
| 8,762,118 B2 | 6/2014 | Nasreldin et al. | |
| 8,898,046 B2 | 11/2014 | Moos et al. | |
| 8,908,473 B2 | 12/2014 | Bradford | |
| 2003/0078734 A1 | 4/2003 | Ozbek | |
| 2004/0199329 A1 | 10/2004 | Stone | |
| 2006/0015310 A1 | 1/2006 | Husen et al. | |
| 2010/0256964 A1 | 10/2010 | Lee et al. | |
| 2011/0077918 A1 | 3/2011 | Mutlu et al. | |
| 2011/0141851 A1 | 6/2011 | Kacewicz et al. | |
| 2011/0246159 A1 | 10/2011 | Herwanger et al. | |

(Continued)

FOREIGN PATENT DOCUMENTS

WO    2014032003 A1    2/2014

OTHER PUBLICATIONS

International Search Report issued in related PCT application PCT/US2015/020236 dated Nov. 24, 2015, 3 pages.

(Continued)

*Primary Examiner* — Ian J Lobo

(57) ABSTRACT

Various implementations directed to determining a fracture type using stress analysis are provided. In one implementation, a method may include receiving seismic data acquired in a seismic survey of a region of interest. The method may also include performing a kinematic analysis on the seismic data. The method may further include generating fracture planes from the seismic data based on the kinematic analysis. The method may additionally include generating a mechanical earth model based on the seismic data. The method may further include performing a critical stress analysis on the fracture planes based on the mechanical earth model. The method may also include determining a fracture type of respective fractures in the fracture planes based on the critical stress analysis.

20 Claims, 8 Drawing Sheets

(56) References Cited

U.S. PATENT DOCUMENTS

| | | |
|---|---|---|
| 2013/0289962 A1 | 10/2013 | Wendt et al. |
| 2013/0345985 A1 | 12/2013 | Priezzhev et al. |
| 2014/0076543 A1 | 3/2014 | Ejofodomi et al. |
| 2014/0200813 A1 | 7/2014 | Montel et al. |
| 2014/0214328 A1 | 7/2014 | Haukas et al. |
| 2014/0230538 A1 | 8/2014 | Hegeman |
| 2014/0278298 A1 | 9/2014 | Maerten |
| 2014/0305638 A1 | 10/2014 | Kresse et al. |
| 2015/0047903 A1 | 2/2015 | Gramstad et al. |
| 2015/0066453 A1* | 3/2015 | Bai ................... G01V 99/005 703/2 |
| 2015/0218925 A1* | 8/2015 | Lecampion ............ E21B 43/26 166/297 |

OTHER PUBLICATIONS

International Preliminary Report on Patentabiliby for the equivalent International patent application PCT/US2015/020236 dated Sep. 21, 2017.

* cited by examiner

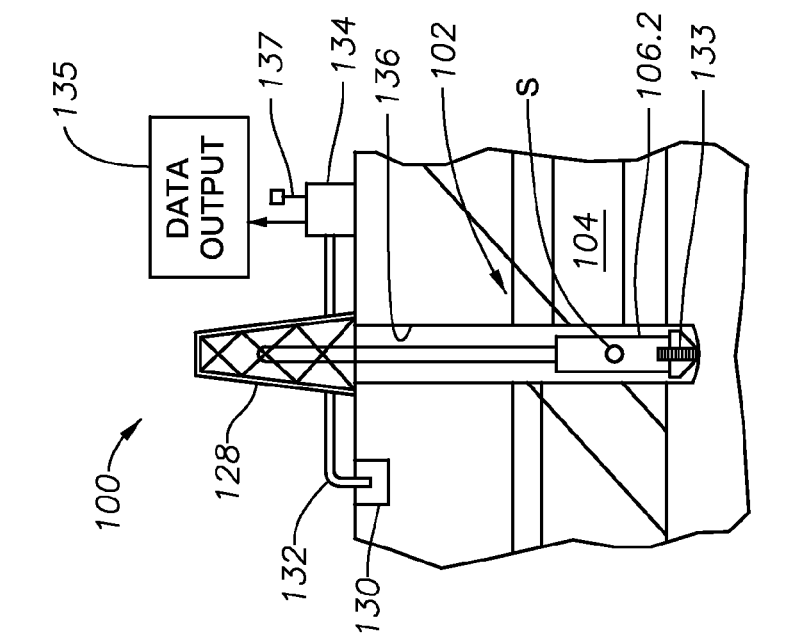
FIG. 1.2
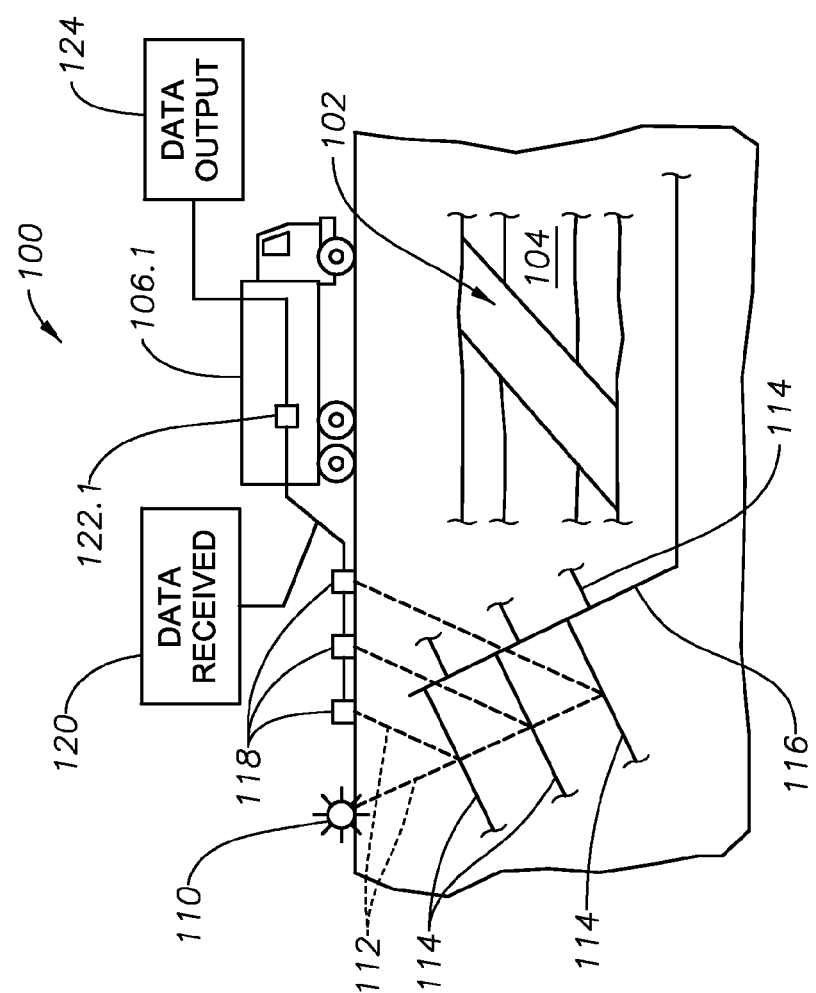
FIG. 1.1

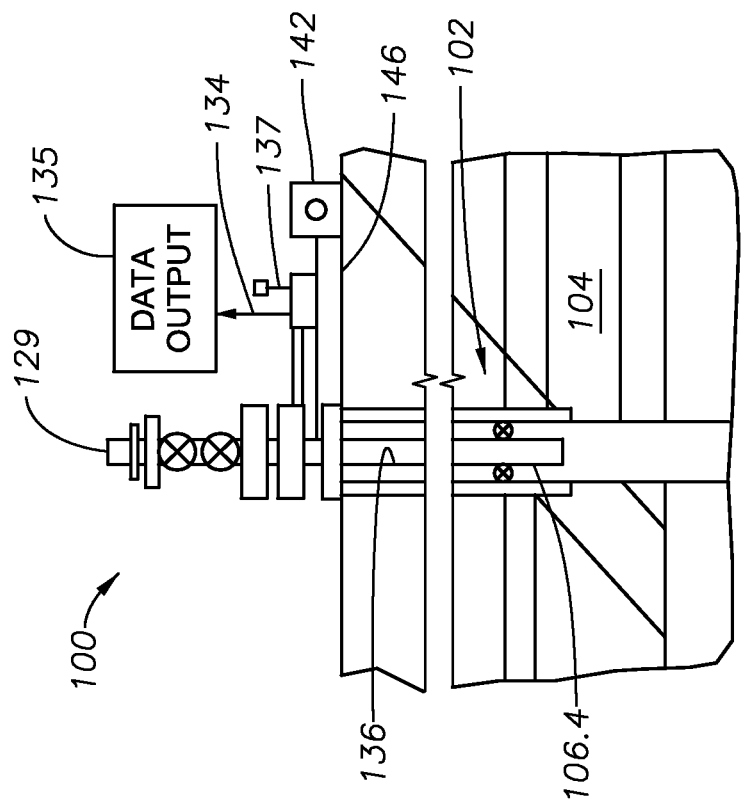
FIG. 1.4
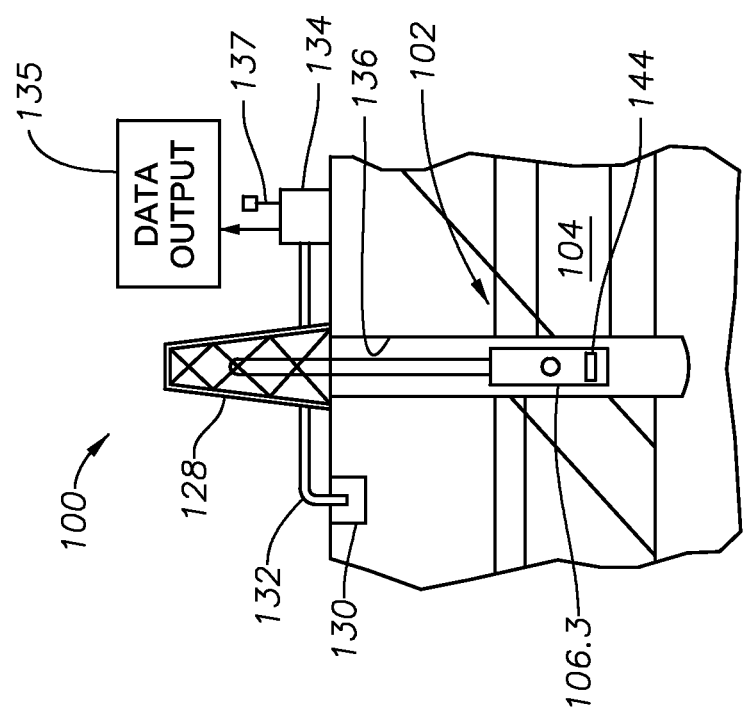
FIG. 1.3

DETERMINING A FRACTURE TYPE USING STRESS ANALYSIS

BACKGROUND

Operations, such as surveying, drilling, wireline testing, completions, and production, may involve various subsurface activities used to locate and gather hydrocarbons from a subterranean reservoir. One or more oil or gas wells may be positioned in the subterranean reservoir, where the wells may be provided with tools capable of advancing into the ground and removing hydrocarbons from the subterranean reservoir. Production facilities may be positioned at surface locations to collect the hydrocarbons from the wells. In particular, a reservoir fluid containing these hydrocarbons may be drawn from the subterranean reservoir and passed to the production facilities using equipment and other transport mechanisms, such as tubing.

In particular, various types of fractures may intersect such wells and may assist the flow of hydrocarbons from a reservoir connected to the fractures, thereby increasing production. Accordingly, increased knowledge of fractures and/or fracture types may assist in planning the locations of new wells.

SUMMARY

Various implementations directed to determining a fracture type using stress analysis are provided. In one implementation, a method may include receiving seismic data acquired in a seismic survey of a region of interest. The method may also include performing a kinematic analysis on the seismic data. The method may further include generating fracture planes from the seismic data based on the kinematic analysis. The method may additionally include generating a mechanical earth model based on the seismic data. The method may further include performing a critical stress analysis on the fracture planes based on the mechanical earth model. The method may also include determining a fracture type of respective fractures in the fracture planes based on the critical stress analysis.

In another implementation, a non-transitory computer-readable medium having stored thereon a plurality of computer-executable instructions which, when executed by a computer, cause the computer to receive seismic data acquired in a seismic survey of a region of interest. The computer-executable instructions may also cause the computer to perform a kinematic analysis on the seismic data. The computer-executable instructions may further cause the computer to generate fracture planes from the seismic data based on the kinematic analysis. The computer-executable instructions may additionally cause the computer to generate a mechanical earth model based on the seismic data. The computer-executable instructions may also cause the computer to perform a critical stress analysis on the fracture planes based on the mechanical earth model. The computer-executable instructions may further cause the computer to determine a fracture type of respective fractures in the fracture planes based on the critical stress analysis.

In yet another implementation, a computer system may include a processor and a memory, the memory having a plurality of program instructions which, when executed by the processor, cause the processor to receive seismic data acquired in a seismic survey of a region of interest. The plurality of program instructions may also cause the processor to perform a kinematic analysis on the seismic data. The plurality of program instructions may further cause the processor to generate fracture planes from the seismic data based on the kinematic analysis. The plurality of program instructions may additionally cause the processor to generate a mechanical earth model based on the seismic data. The plurality of program instructions may also cause the processor to perform a critical stress analysis on the fracture planes based on the mechanical earth model. The plurality of program instructions may further cause the processor to determine a fracture type of respective fractures in the fracture planes based on the critical stress analysis.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve any disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various techniques will hereafter be described with reference to the accompanying drawings. It should be understood, however, that the accompanying drawings illustrate the various implementations described herein and are not meant to limit the scope of various techniques described herein.

FIGS. 1.1-1.4 illustrate simplified, schematic views of an oilfield having subterranean formation containing reservoir therein in accordance with implementations of various technologies and techniques described herein.

DETAILED DESCRIPTION

Figure 2:
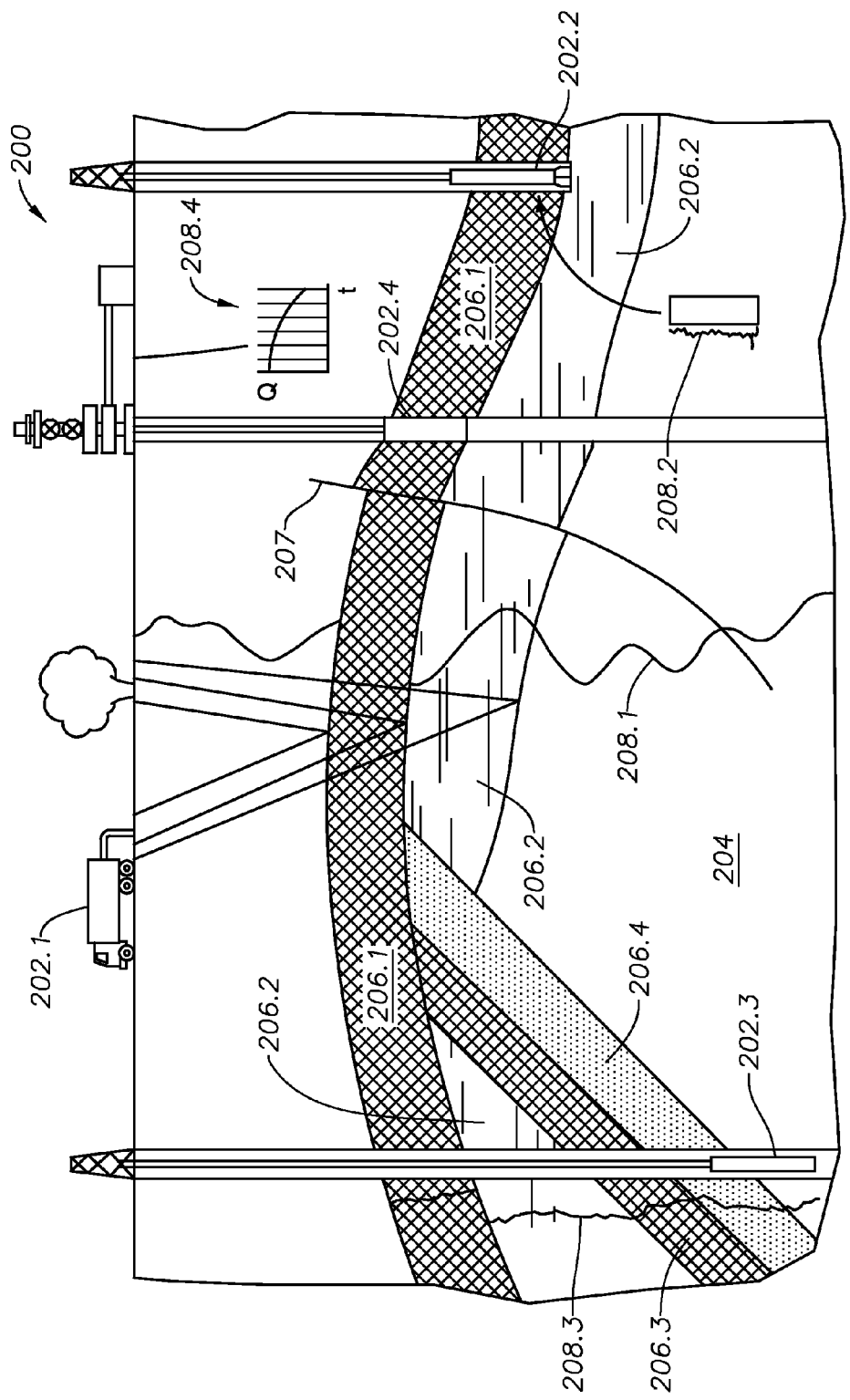
FIG. 2 illustrates a schematic view, partially in cross section of an oilfield having data acquisition tools positioned at various locations along the oilfield for collecting data of a subterranean formation in accordance with implementations of various technologies and techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more implementations of various techniques for determining a fracture type using stress analysis will now be described in more detail with reference to FIGS. 1.1-7 in the following paragraphs.

Production Environment

FIGS. 1.1-1.4 illustrate simplified, schematic views of a production field 100 having subterranean formation 102 containing reservoir 104 therein in accordance with implementations of various technologies and techniques described herein. The production field 100 may be an oilfield, a gas field, and/or the like. FIG. 1.1 illustrates a survey operation being performed by a survey tool, such as seismic truck 106.1, to measure properties of the subterranean formation 102. The survey operation may be a seismic survey operation for producing sound vibrations. In FIG. 1.1, one such sound vibration, e.g., sound vibration 112 generated by source 110, may reflect off horizons 114 in earth formation 116. A set of sound vibrations may be received by sensors, such as geophone-receivers 118, situated on the earth's surface. The data received 120 may be provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 may be used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling mud. The drilling tools may be advanced into subterranean formations 102 to reach reservoir 104. Each well may target one or more reservoirs. The drilling tools may be adapted for measuring downhole properties using logging while drilling tools. The logging while drilling tools may also be adapted for taking core sample 133 as shown.

Computer facilities may be positioned at various locations about the production field 100 (e.g., the surface unit 134) and/or at remote locations. Surface unit 134 may be used to communicate with the drilling tools and/or offsite operations, as well as with other surface or downhole sensors. Surface unit 134 may be capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about production field 100 to collect data relating to various production field operations as described previously. As shown, sensor (S) may be positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly may include capabilities for measuring, processing, and storing information, as well as communicating with surface unit 134. The bottom hole assembly may further include drill collars for performing various other measurement functions.

The bottom hole assembly may include a communication subassembly that communicates with surface unit 134. The communication subassembly may be adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It may be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the well site. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the production field 100 or other locations. Surface unit 134 may also be provided with or functionally connected to one or more controllers (not shown) for actuating mechanisms at production field 100. Surface unit 134 may then send command signals to production field 100 in response to data received. Surface unit 134 may receive commands via transceiver 137 or may itself execute commands to the controller. A processor may be provided to analyze the data (locally or remotely), make the decisions and/or actuate the controller. In this manner, production field 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 may be adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about production field 100 to collect data relating to various field operations as described previously. As shown, sensor S may be positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about production field 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the well sites for selectively collecting downhole fluids from the well site(s).

While FIGS. 1.2-1.4 illustrate tools used to measure properties of a production field, such as an oilfield or gas field, it may be appreciated that the tools may be used in connection with other operations, such as mines, aquifers, storage, or other subterranean facilities. Also, while certain data acquisition tools are depicted, it may be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 may be an example of a field usable with oilfield or gas field application frameworks. At least part of the production field 100 may be on land, water, and/or sea. Also, while a single field measured at a single location may be depicted, oilfield or gas field applications may be utilized with any combination of one or more oilfields and/or gas field, one or more processing facilities and one or more well sites.

FIG. 2 illustrates a schematic view, partially in cross section of production field 200 having data acquisition tools 202.1, 202.2, 202.3 and 202.4 positioned at various locations along production field 200 for collecting data of subterranean formation 204 in accordance with implementations of various technologies and techniques described herein. The production field 200 may be an oilfield, a gas field, and/or the like. Data acquisition tools 202.1-202.4 may be the same as data acquisition tools 106.1-106.4 of FIGS. 1.1-1.4, respectively, or others not depicted. As shown, data acquisition tools 202.1-202.4 may generate data plots or measurements 208.1-208.4, respectively. These data plots may be depicted along production field 200 to demonstrate the data generated by the various operations.

Data plots 208.1-208.3 may be examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 may be a seismic two-way response over a period of time. Static plot 208.2 may be core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 may be a logging trace that may provide a resistivity or other measurement of the formation at various depths.

A production decline curve or graph 208.4 may be a dynamic data plot of the fluid flow rate over time. The production decline curve may provide the production rate as a function of time. As the fluid flows through the wellbore, measurements may be taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 may have a plurality of geological formations 206.1-206.4. As shown, this structure may have several formations or layers, including a shale layer 206.1, a carbonate layer 206.2, a shale layer 206.3 and a sand layer 206.4. A fault 207 may extend through the shale layer 206.1 and the carbonate layer 206.2. The static data acquisition tools may be adapted to take measurements and detect characteristics of the formations.

While a specific subterranean formation with specific geological structures is depicted, it may be appreciated that production field 200 may contain a variety of geological structures and/or formations, sometimes having extreme complexity. In some locations, such as below the water line, fluid may occupy pore spaces of the formations. Each of the measurement devices may be used to measure properties of the formations and/or its geological features. While each acquisition tool may be shown as being in specific locations in production field 200, it may be appreciated that one or more types of measurement may be taken at one or more locations across one or more fields or other locations for comparison and/or analysis.

The data collected from various sources, such as the data acquisition tools of FIG. 2, may then be processed and/or evaluated. The seismic data displayed in static data plot 208.1 from data acquisition tool 202.1 may be used by a geophysicist to determine characteristics of the subterranean formations and features. The core data shown in static plot 208.2 and/or log data from well log 208.3 may be used by a geologist to determine various characteristics of the subterranean formation. The production data from graph 208.4 may be used by the reservoir engineer to determine fluid flow reservoir characteristics. The data analyzed by the geologist, geophysicist and the reservoir engineer may be analyzed using modeling techniques.

Figure 3:
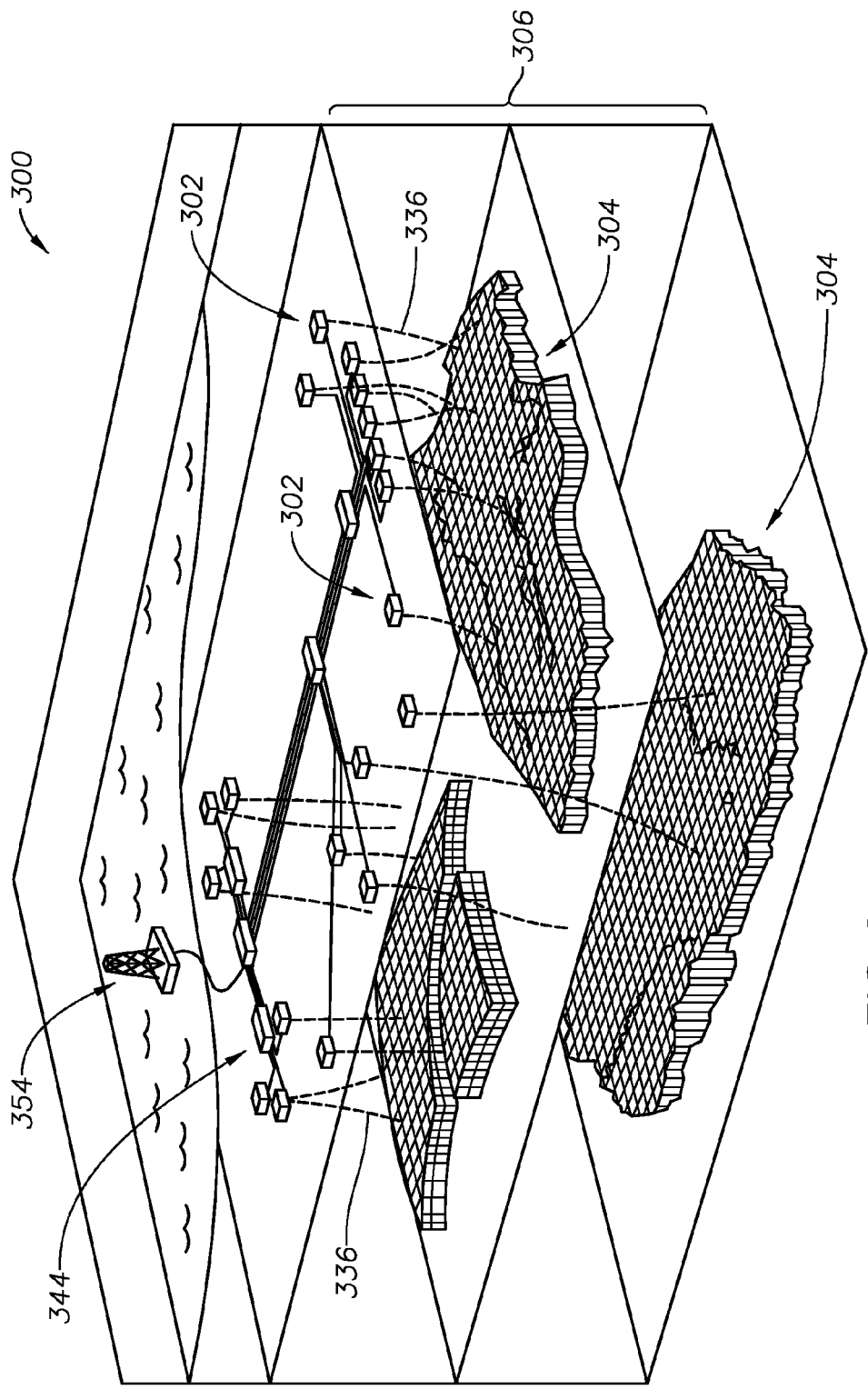
FIG. 3 illustrates an oilfield for performing production operations in accordance with implementations of various technologies and techniques described herein.

FIG. 3 illustrates a production field 300 for performing production operations in accordance with implementations of various technologies and techniques described herein. The production field 300 may be an oilfield, a gas field, and/or the like. As shown, the production field 300 may have a plurality of well sites 302 operatively connected to central processing facility 354. The production field configuration of FIG. 3 may not be intended to limit the scope of the production field application system. At least part of the production field may be on land and/or sea. Also, while a single production field with a single processing facility and a plurality of well sites is depicted, any combination of one or more production fields, one or more processing facilities and one or more well sites may be present.

Each well site 302 may have equipment that forms wellbore 336 into the earth. The wellbores may extend through subterranean formations 306 including reservoirs 304. These reservoirs 304 may contain fluids, such as hydrocarbons. The well sites may draw fluid from the reservoirs and pass them to the processing facilities via surface networks 344. The surface networks 344 may have tubing and control mechanisms for controlling the flow of fluids from the well site to processing facility 354.

Figure 4:
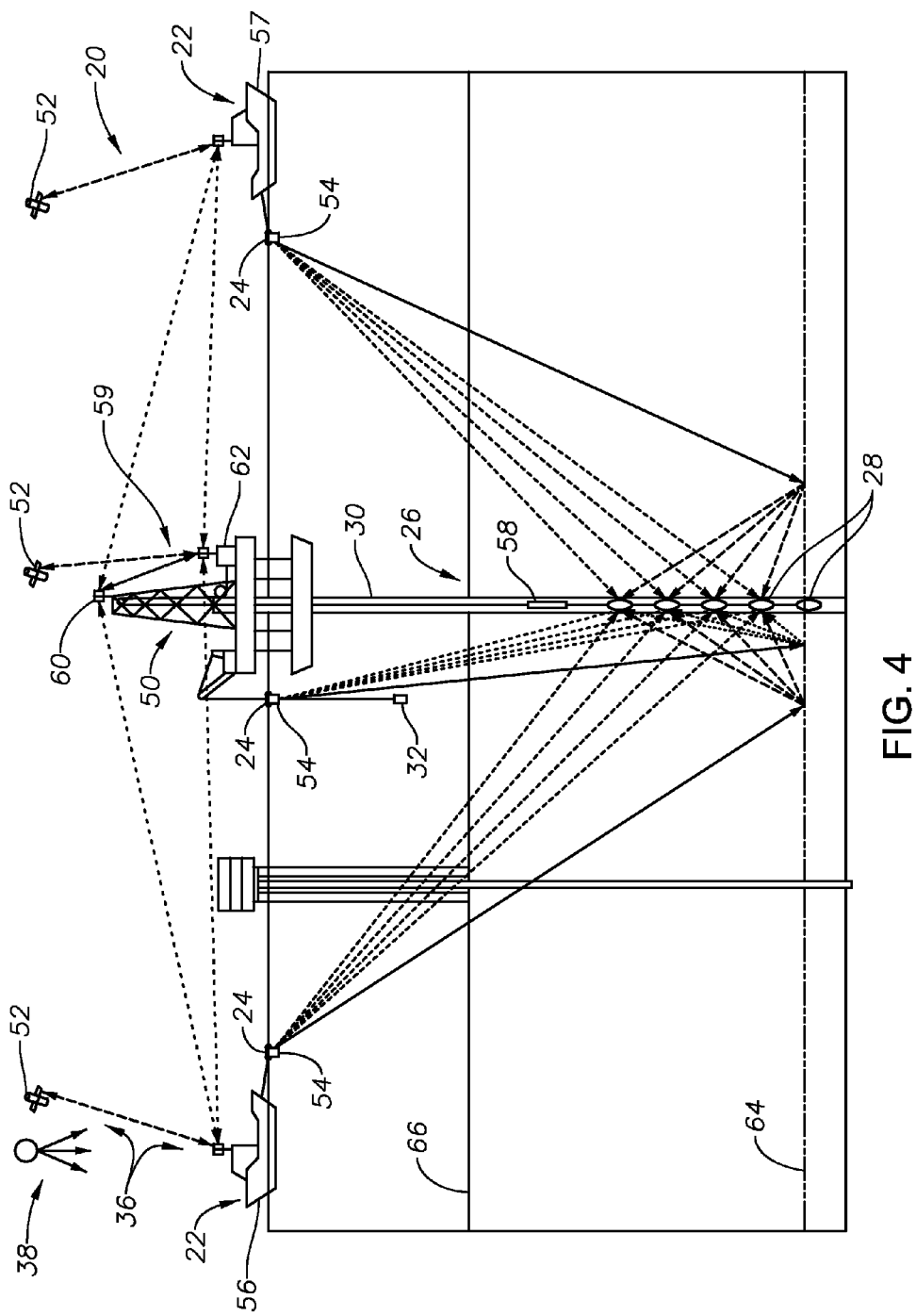
FIG. 4 illustrates a seismic system in accordance with implementations of various technologies and techniques described herein.

FIG. 4 illustrates a seismic system 20 in accordance with implementations of various technologies and techniques described herein. The seismic system 20 may include a plurality of tow vessels 22 that are employed to enable seismic profiling, e.g. three-dimensional vertical seismic profiling or rig/offset vertical seismic profiling. In FIG. 4, a marine system may include a rig 50, a plurality of vessels 22, and one or more acoustic receivers 28. Although a marine system is illustrated, other implementations of the disclosure may not be limited to this example. A person of ordinary skill in the art may recognize that land or offshore systems may be used.

Although two vessels 22 are illustrated in FIG. 4, a single vessel 22 with multiple source arrays 24 or multiple vessels 22 with single or multiple sources 24 may be used. In some implementations, at least one source and/or source array 24 may be located on the rig 50, as shown by the rig source in FIG. 4. As the vessels 22 travel on predetermined or systematic paths, their locations may be recorded through the use of navigation system 36. In some implementations, the navigation system 36 may utilize a global positioning system (GPS) 38 to record the position, speed, direction, and other parameters of the tow vessels 22.

As shown, the global positioning system 38 may utilize or work in cooperation with satellites 52 which operate on a suitable communication protocol, e.g. VSAT communications. The VSAT communications may be used, among other things, to supplement VHF and UHF communications. The GPS information can be independent of the VSAT communications and may be input to a processing system or other suitable processors to predict the future movement and position of the vessels 22 based on real-time information. In addition to predicting future movements, the processing system also can be utilized to provide directions and coordinates as well as to determine initial shot times, as described above. A control system effectively utilizes the processing system in cooperation with a source controller and a synchronization unit to synchronize the sources 24 with the downhole data acquisition system 26.

As shown, the one or more vessels 22 may respectively tow one or more acoustic sources/source arrays 24. The source arrays 24 include one or more seismic signal generators 54, e.g. air guns, configured to create a seismic and/or sonic disturbance. In the implementation illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 4) or at another suitable location, and both vessels 22 may serve as slave vessels with respect to the rig source 24 or with respect to a source at another location.

However, a variety of source arrangements and implementations may be used. When utilizing dithered timing between the sources, for example, the master and slave locations of the sources can be adjusted according to the parameters of the specific seismic profiling application. In some implementations, one of the source vessels 22 (e.g. source vessel A in FIG. 4) may serve as the master source vessel while the other source vessel 22 serves as the slave source vessel with dithered firing. However, an alternate source vessel 22 (e.g. source vessel B in FIG. 4) may serve as the master source vessel while the other source vessel 22 serves as the slave source vessel with dithered firing.

Similarly, the rig source 22 may serve as the master source while one of the source vessels 22 (e.g. vessel A) serves as the slave source vessel with dithered firing. The rig source 22 also may serve as the master source while the other source vessel 22 (e.g. vessel B) serves as the slave source vessel with dithered firing. In some implementations, the rig source 22 may serve as the master source while both of the source vessels 22 serve as slave source vessels each with dithered firings. These and other implementations may be used in achieving the desired synchronization of sources 22 with the downhole acquisition system 26.

The acoustic receivers 28 of data acquisition system 26 may be deployed in borehole 30 via a variety of delivery systems, such as wireline delivery systems, slickline delivery systems, and other suitable delivery systems. Although a single acoustic receiver 28 could be used in the borehole 30, a plurality of receivers 28, as shown, may be located in a variety of positions and orientations. The acoustic receivers 28 may be configured for sonic and/or seismic reception. Additionally, the acoustic receivers 28 may be communicatively coupled with processing equipment 58 located downhole. In one implementation, processing equipment 58 may comprise a telemetry system for transmitting data from acoustic receivers 28 to additional processing equipment 59 located at the surface, e.g. on the rig 50 and/or vessels 22.

Depending on the data communication system, surface processing equipment 59 may include a radio repeater 60, an acquisition and logging unit 62, and a variety of other and/or additional signal transfer components and signal processing components. The radio repeater 60 along with other components of processing equipment 59 may be used to communicate signals, e.g. UHF and/or VHF signals, between vessels 22 and rig 50 and to enable further communication with downhole data acquisition system 26.

It should be noted the UHF and VHF signals can be used to supplement each other. The UHF band may support a higher data rate throughput, but can be susceptible to obstructions and has less range. The VHF band may be less susceptible to obstructions and may have increased radio range but its data rate throughput is lower. In FIG. 4, the VHF communications may "punch through" an obstruction in the form of a production platform.

In some implementations, the acoustic receivers 28 may be coupled to surface processing equipment 59 via a hardwired connection. In other implementations, wireless or optical connections may be employed. In still other implementations, combinations of coupling techniques may be employed to relay information received downhole via the acoustic receivers 28 to an operator and/or the control system described above, located at least in part at the surface.

In addition to providing raw or processed data uphole to the surface, the coupling system, e.g. downhole processing equipment 58 and surface processing equipment 59, may be designed to transmit data or instructions downhole to the acoustic receivers 28. For example, the surface processing equipment 59 may comprise a synchronization unit, which may coordinate the firing of sources 24, e.g. dithered (delayed) source arrays, with the acoustic receivers 28 located in borehole 30. In one implementation, the synchronization unit may use a coordinated universal time to ensure accurate timing. In some implementations, the coordinated universal time system may be employed in cooperation with global positioning system 38 to obtain UTC data from the GPS receivers of GPS system 38.

FIG. 4 illustrates one example of a system for performing seismic profiling that can employ simultaneous or near-simultaneous acquisition of seismic data. In one implementation, the seismic profiling may comprise three-dimensional vertical seismic profiling, but other applications may utilize rig and/or offset vertical seismic profiling or seismic profiling employing walkaway lines. An offset source can be provided by a source 24 located on rig 50, on a vessel 22, and/or on another vessel or structure. In one implementation, the vessels 22 may be substantially stationary.

In one implementation, the overall seismic system 20 may employ various arrangements of sources 24 on vessels 22 and/or rig 50 with each location having at least one source and/or source array 24 to generate acoustic source signals. The acoustic receivers 28 of downhole acquisition system 26 may be configured to receive the source signals, at least some of which are reflected off a reflection boundary 64 located beneath a sea bottom 66. The acoustic receivers 28 may generate data streams that are relayed uphole to a suitable processing system, e.g. the processing system described above, via downhole telemetry/processing equipment 58.

While the acoustic receivers 28 generate data streams, the navigation system 36 may determine a real-time speed, position, and direction of each vessel 22 and may estimate initial shot times accomplished via signal generators 54 of the appropriate source arrays 24. The source controller may be part of surface processing equipment 59 (located on rig 50, on vessels 22, or at other suitable locations) and may be designed to control firing of the acoustic source signals so that the timing of an additional shot time (e.g. a shot time via slave vessel 57) is based on the initial shot time (e.g. a shot time via master vessel 56) plus a dither value.

The synchronization unit of, for example, surface processing equipment 59, may coordinate the firing of dithered acoustic signals with recording of acoustic signals by the downhole acquisition system 26. The processor system may be configured to separate a data stream of the initial shot and a data stream of the additional shot via a coherency filter. As discussed above, however, other implementations may employ pure simultaneous acquisition and/or may not use separation of the data streams. In such implementations, the dither is effectively zero.

After an initial shot time at T=0 (T0) is determined, subsequent firings of acoustic source arrays 24 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 24 fire in simultaneous or near-simultaneous patterns may reduce the overall amount of time for three-dimensional vertical seismic profiling source acquisition. This, in turn, may significantly reduce rig time. As a result, the overall cost of the seismic operation may be reduced, rendering the data intensive process much more accessible.

If the acoustic source arrays used in the seismic data acquisition are widely separated, the difference in move-outs across the acoustic receiver array of the wave fields generated by the acoustic sources 24 can be used to obtain a clean data image via processing the data without further special considerations. However, even when the acoustic sources 24 are substantially co-located in time, data acquired by any of the methods involving dithering of the firing times of the individual sources 24 described herein can be processed to a formation image leaving hardly any artifacts in the final image. This is accomplished by taking advantage of the incoherence of the data generated by one acoustic source 24 when seen in the reference time of the other acoustic source 24.

Attention is now directed to methods, techniques, and workflows for processing and/or transforming collected data that are in accordance with some implementations. Some operations in the processing procedures, methods, techniques, and workflows disclosed herein may be combined and/or the order of some operations may be changed. In the geosciences and/or other multi-dimensional data processing disciplines, various interpretations, sets of assumptions, and/or domain models such as velocity models, may be refined in an iterative fashion; this concept may be applicable to the procedures, methods, techniques, and workflows as discussed herein. This iterative refinement can include use of feedback loops executed on an algorithmic basis, such as via a computing system, as discussed later, and/or through manual control by a user who may make determinations regarding whether a given action, template, or model has become accurate.

Determining a Fracture Type

As noted above, various forms of seismic surveys may be used to acquire seismic data related to a region of interest, such as three-dimensional (3D) seismic surveys and/or the like. In one implementation, the acquired seismic data may be in the form of a seismic volume of the region of interest.

Subsurface formations of the region of interest may include one or more fractures, where the fractures may be cracks that allow hydrocarbons of one or more reservoirs in the region to move toward one or more wells. The fractures may include natural fractures, hydraulic fractures, and/or the like. The fractures may be organized into one or more fracture sets or fracture corridors.

The fractures may be categorized based on fracture type. Fracture type may refer to whether a fracture has an open aperture (i.e., an open fracture) or a closed aperture (i.e., a closed fracture). Fracture type may impact reservoir productivity, as open fractures may conduct reservoir fluids while closed fractures may act as no-flow boundaries or baffles in the reservoir. Accordingly, knowledge of such fracture types for the fractures in the region of interest may be useful in the development of drilling plans, design of the placement of wells, the estimation of hydrocarbon production, and/or the like.

Figure 5:
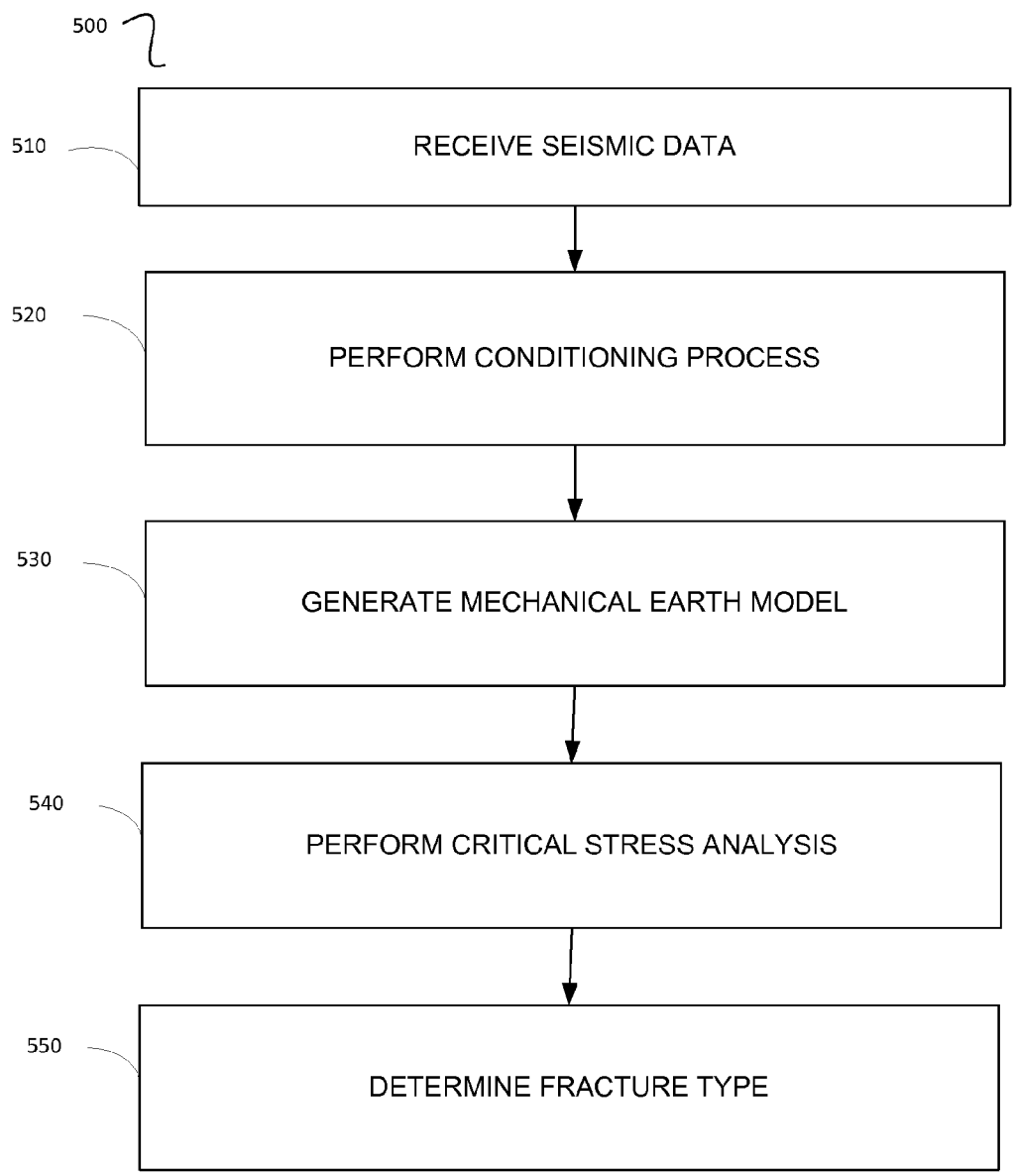
FIG. 5 illustrates a flow diagram of a method for determining a fracture type of one or more fractures in a region of interest in accordance with implementations of various techniques described herein.

In one implementation, fracture types of one or more fractures in a region of interest may be determined based on a critical stress analysis, as further described below. FIG. 5 illustrates a flow diagram of a method 500 for determining a fracture type of one or more fractures in a region of interest in accordance with implementations of various techniques described herein. In one implementation, method 500 may be performed by a computer application. It should be understood that while method 500 indicates a particular order of execution of operations, in some implementations, certain portions of the operations might be executed in a different order. Further, in some implementations, additional operations or blocks may be added to the method. Likewise, some operations or blocks may be omitted.

At block 510, seismic data for a region of interest may be received. The region of interest may include one or more subterranean formations or other areas of a subsurface of the earth that may be of particular interest. For example, the region of interest may include one or more geological formations, reservoirs, and/or the like that may possibly contain hydrocarbons. The subsurface formations of the region of interest may include one or more discontinuities, such as one or more fractures, one or more faults, one or more bedding planes, one or more planes of weakness, and/or the like.

The seismic data may be obtained and/or received using any implementation known to those skilled in the art, such as the one or more implementations discussed above with respect to FIGS. 1.1-4. As mentioned above, in one implementation, the seismic data may be received in the form of a seismic volume of the region of interest. The seismic volume may be 3D and may be in any form known to those skilled in the art, including, for example, a 3D seismic cube.

At block 520, a conditioning process may be performed on the seismic data. The conditioning process may be used to identify the one or more fractures in the region of interest based on the seismic data. In particular, the conditioning process may be used to generate one or more fracture planes of the region of interest based on the seismic data. In one implementation, the conditioning process may be performed on a seismic volume as described above.

Figure 6:
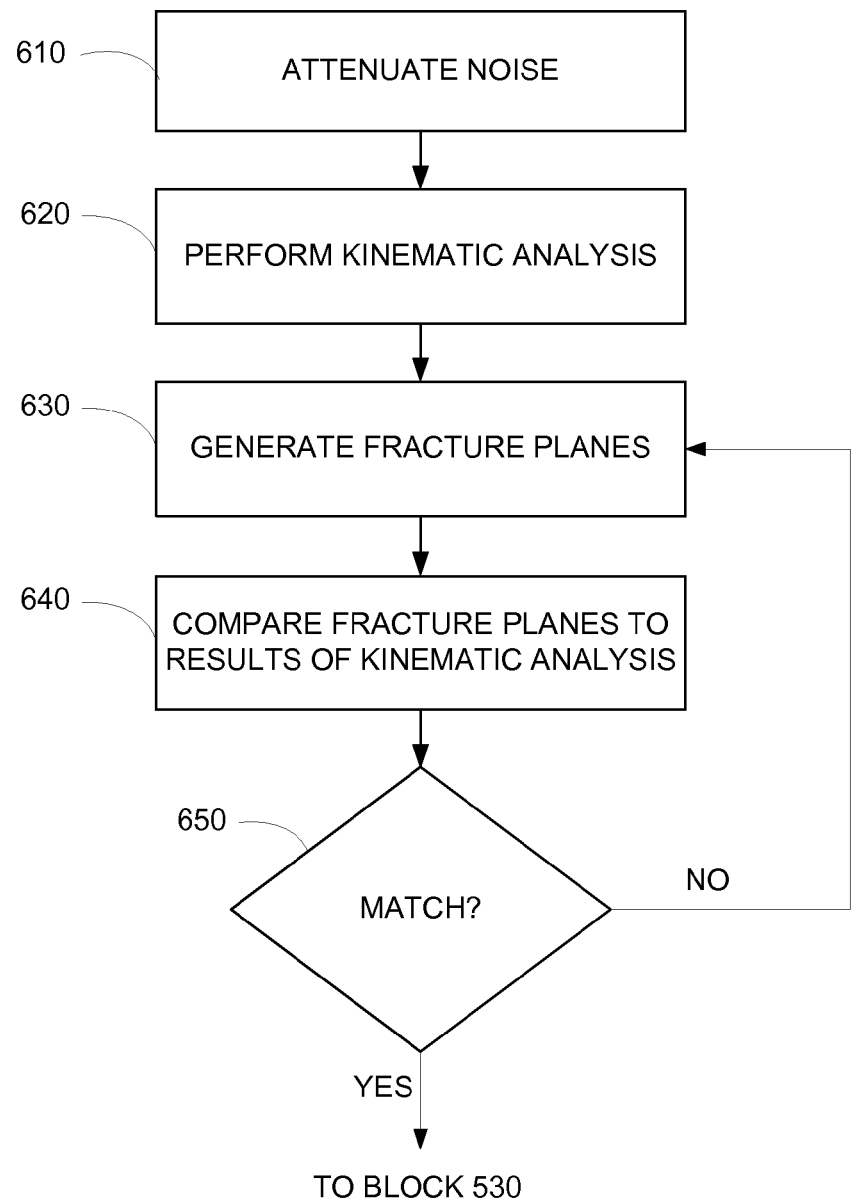
FIG. 6 illustrates a flow diagram of a method for performing a conditioning process on seismic data in accordance with implementations of various techniques described herein.

FIG. 6 illustrates a flow diagram of a method 600 for performing the conditioning process on the seismic data in accordance with implementations of various techniques described herein. In one implementation, method 600 may be performed by a computer application. It should be understood that while method 600 indicates a particular order of execution of operations, in some implementations, certain portions of the operations might be executed in a different order. Further, in some implementations, additional operations or blocks may be added to the method. Likewise, some operations or blocks may be omitted.

At block 610, noise in the seismic data may be attenuated. In particular, seismic data may contain coherent noise signals (i.e., artifacts), along with seismic reflection signals (as described above). These noise signals, hereafter referred to as noise, may interfere with the interpretation of the seismic reflection signals, and may degrade the quality of the subsurface images that can be obtained by further processing.

For example, sensors (as described above with respect to FIGS. 1.1-4) may detect reflected signals that include primaries and multiples as well as other noise sources in the region of interest. A primary may be a seismic wave that has reflected once off of an interface before being detected by a sensor. A multiple, on the other hand, may be a seismic wave that has reflected off of an interface more than once, i.e., multiple times. Such multiples may be considered extraneous noise which may obscure the desired primary reflection signal. Other types of noise may include direct arrivals, ground-roll, ambient noise, and/or any other noise known to those skilled in the art.

One or more noise attenuation techniques known to those skilled in the art may be used to reduce the noise that is present in the seismic data before processing it for imaging. In one implementation, the noise attenuation techniques may include filtering (e.g., low cut filtering), smoothing (e.g., spatial smoothing), and/or other techniques known to those skilled in the art.

In another implementation, one or more techniques (e.g., mathematical operations) known to those skilled in the art may be used to detect chaos (i.e., chaotic noise) in the seismic data. In one scenario, the chaotic noise may be related to one or more geological features of the region of interest. For example, the chaotic noise may be generated due to a fracture or fault plane intersecting a particular lithological feature of the region of interest. In such a scenario, the chaotic noise may be magnified in the seismic data using one or more techniques known to those skilled in the art.

In another scenario, the chaotic noise may not be related to the one or more geological features of the region of interest. In such a scenario, upon detection of the chaotic noise, one or more noise attenuation techniques known to those skilled in the art may be used to reduce the chaotic noise that is present in the recorded data.

At block 620, a kinematic analysis may be performed on the seismic data. In particular, the kinematic analysis may be performed on the noise-attenuated seismic data.

In one implementation, a kinematic analysis of the seismic data may be used to develop kinematic data for the region of interest, such as, for example, a kinematic model. The kinematic model may show an evolution of the geometries of subterranean formations in the region of interest over time. In particular, the kinematic model may illustrate, over time, how the subterranean formations may be affected by displacements along one or more fractures, such as, for example, by illustrating a history of fracture and/or fault movements within the formations. The kinematic analysis may be performed using any technique known to those skilled in the art. In another implementation, the kinematic model may be two-dimensional (2D) or 3D.

At block 630, one or more fracture planes of the region of interest may be generated based on the seismic data. In particular, the one or more fracture planes may be generated based on the noise-attenuated seismic data. Any implementation known to those skilled in the art may be used to generate the one or more fracture planes based on the seismic data.

In one such implementation, and as is known to those skilled in the art, ant tracking technology may be used to generate the fracture planes. Ant tracking technology may be used to perform edge enhancement for the identification of faults, fractures, and/or other linear anomalies within a seismic volume. In particular, ant tracking may be performed to generate ant track data (e.g., an ant tracking cube or ant tracking volume) and enhance trends within the seismic volume. The technology may use an ant tracking algorithm to automatically derive faults, fractures, and/or other geological features from a seismic volume. The ant tracking algorithm may operate by emulating the behavior of ant colonies in nature and how they use foramens to mark their paths in order to optimize the search for food. Similarly, "artificial ants" may be put as seeds on a seismic volume to look for discontinuities, such as fracture zones. Virtual pheromones deployed by the ants may capture information related to the fracture zones in the seismic volume. Examples of ant tracking technology are provided in commonly assigned U.S. Patent Application Publication No. 2010/0256964, the entire contents of which are hereby incorporated herein.

The result of the ant track algorithm may be ant track data (e.g., an ant tracking cube or ant tracking volume) that show fracture zones in detail. The ant track data may contain the location and distribution of the complex fractures of the seismic volume. In particular, the complex fractures in the ant track data may be represented by one or more fracture planes.

Such fracture planes may be extracted from the ant track data for further processing. The fracture planes may be extracted from the ant track data either manually or automatically. In one implementation, a fracture extraction process may be used to extract the one or more fracture planes. For example, an automatic fault patch extraction process may be used to extract planes representing the complex fractures identified from the ant track algorithm. In a further implementation, the extracted fracture planes may be in the form of an extracted fracture volume. In such an implementation, the extracted fracture volume may be 3D.

At block 640, the one or more generated fracture planes may be compared to the results of the kinematic analysis. In particular, the one or more fractures of the generated fracture planes may be compared to the kinematic data produced by the kinematic analysis. In one implementation, fractures of the one or more extracted fracture planes from the ant track data (as described above) may be compared to the kinematic model (as described above).

At block 650, a determination may be made as to whether the one or more generated fracture planes match the results of the kinematic analysis.

As noted above, the results of the kinematic analysis may be in the form of a kinematic model. Such a kinematic model may indicate one or more areas of the region of interest having a higher potential of having fractures than other areas. Further, the kinematic model may also indicate one or more areas having a lower potential of having fractures than other areas. The identification of the high and low potential areas may be based on a history of geological and/or structural changes (e.g., a history of fracture and/or fault movements) that have taken place in the region of interest.

Accordingly, in one implementation, the fractures of the generated planes may match the results of the kinematic analysis (i.e., the kinematic model) if a predetermined number of the fractures of the generated planes are positioned in the high potential areas indicated by the kinematic model. The fractures of the generated planes that are positioned in the low potential areas indicated by the kinematic model may be considered to be artificial, inaccurate, and/or the like. In one implementation, the generated fracture planes may be the extracted fracture planes of the ant track data.

If the results of the kinematic analysis do not match the generated fracture planes, then method 600 may return to block 630 to generate a new set of fracture planes based on the noise-attenuated seismic data. In one implementation, one or more parameters of the ant tracking algorithm may be altered to generate new ant track data, from which a new set of fracture planes may be extracted at block 630. In such an implementation, the parameters may be altered based on the extent to which the previous fractures planes did not match the results of the kinematic analysis, such as by a number of mismatching fractures, positioning of the mismatching fractures, and/or the like. In a further implementation, the parameters of the ant tracking algorithm that may be altered may include: an initial ant boundary (i.e., the initial distribution of agents throughout the volume and controls the level of detail revealed by the ants); an ant tract deviation (i.e., how much the ants can deviate from the initial ant boundary); an ant step size (i.e., how far an ant can search to find a connection); illegal steps allowed (i.e., how many steps an ant agent can go without finding any connection); legal steps (i.e., the number of steps for a valid connection); and, stop criteria percentage (used to terminate an ant's advance when too many illegal steps have been taken).

The new set of fracture planes may be compared to the results of the kinematic analysis at block 640, and, at block 650, a determination may be made as to whether the new set of fracture planes match the results of the kinematic analysis. In particular, the new set of fractures planes may match the results of the kinematic analysis if a predetermined number of fractures of the new set of fracture planes are positioned in the high potential areas indicated by the results of the kinematic analysis. If not, method 600 may then loop again to block 630, where parameters of the ant tracking algorithm may be altered further. Method 600 may repeat blocks 630, 640, and 650 until one or more fracture planes match the results of the kinematic analysis as described above.

On the other hand, if the results of the kinematic analysis do match the generated fracture planes, then method 600 may proceed to block 530 of method 500.

Returning to FIG. 5, at block 530, a mechanical earth model (MEM) may be generated based on the seismic data received at block 510. As is known in the art, a MEM may be used to quantitatively describe one or more rock, elastic, and/or stress properties of subsurface formations in a region of interest. In one implementation, the MEM may be one-dimensional (1D) or 3D. In another implementation, the MEM may be generated before, after, or in parallel with the conditioning process of block 520.

One or more geomechanical modeling techniques known to those skilled in the art may be used to generate the MEM. Examples of such techniques are provided in commonly assigned U.S. Pat. No. 8,577,660, the entire content of which is hereby incorporated by reference. The MEM may be generated by information gathered using the implementations discussed above with respect to FIGS. 1.1-4. For example, the MEM may take into account various reservoir data collected beforehand, including the seismic data collected during early exploration of the formation and logging data collected from the drilling of one or more exploration wells before production (see, e.g., FIGS. 1.1-4). The MEM may be used to provide, for example, geomechanical information for various oilfield operations, such as casing point selection, optimizing the number of casing strings, drilling stable wellbores, designing completions, performing fracture stimulation, and/or the like. Generating the MEM may simulate the subterranean formation under development (e.g., generating a numerical representation of a state of stress and formation mechanical properties for a given stratigraphic section in an oilfield or basin).

In addition, upon generating the MEM, various geomechanical properties of the region of interest may be derived using the MEM. These geomechanical properties may include: rock properties, such as compressive strength, tensile strength, and/or the like; elastic properties, such as Young's modulus, Poisson's ratio, bulk modulus, shear modulus, Biot's parameter, and/or the like; and, stress properties, such as overburden stress, tectonic stresses, the magnitude of the minimum stress, the minimum horizontal stress, the maximum horizontal stress, pore pressure, and/or the like. The geomechanical properties may be derived using any technique known to those skilled in the art.

At block 540, a critical stress analysis may be performed on the generated fracture planes from block 650 based on the generated MEM. As mentioned above, the generated fracture planes from block 650 have been determined as matching the results of the kinematic analysis.

The critical stress analysis may be used to determine which fractures of the generated fracture plane are critically stressed. A critically stressed fracture may be more conductive to the flow of reservoir fluids than a fracture that is not critically stressed. Further, such a critically stressed fracture may be identified as being in at least an initial stage of shear failure, i.e., where a shear stress acting on the fracture is greater than a normal stress acting on the fracture.

The shear stress and the normal stress for each fracture of each generated fracture planes may be calculated and compared. In one implementation, and as known to those skilled in the art, the shear stress and the normal stress may be calculated based on one or more geomechanical properties derived from the MEM of block 530. For example, the shear stress and/or the normal stress may be calculated based on the Young's modulus, Poisson's ratio, pore pressure, and/or the like. Examples of techniques for calculating the shear stress and normal stress are provided in commonly assigned U.S. Pat. No. 7,177,764 and U.S. Pat. No. 8,600,716, the entire contents of which are hereby incorporated by reference.

Once calculated, the shear stress and the normal stress acting on each fracture of each generated fracture plane may be compared to determine whether the shear stress is greater than the normal stress. If the shear stress acting on a fracture is greater than the normal stress acting on the fracture, then the fracture may be identified as a critically stressed fracture.

At block 550, a fracture type of one or more fractures of the generated fracture planes may be determined based on the critical stress analysis. As noted above, fractures may be categorized based on fracture types such as an open fracture or a closed fracture.

In one implementation, a fracture identified as critically stressed may be considered to be an open fracture, whereas a fracture not identified as critically stressed may be considered to be a closed fracture. As is noted above, a critically stressed fracture may be more conductive to the flow of reservoir fluids than a fracture that is not critically stressed. Therefore, a critically stressed fractured may be more likely to be an open fracture than a closed fracture, as open fractures may conduct reservoir fluids while closed fractures may act as no-flow boundaries or baffles in the reservoir.

In a further implementation, the generated fracture planes may be filtered such that its closed fractures have been removed. In such an implementation, the filtered fracture planes may be composed of open fractures. Further, such filtered fracture planes may be formed into an open fracture volume, where such a volume may be 3D.

In sum, the implementations for determining a fracture type using stress analysis, as described above with respect to FIGS. 1.1-6, may assist with the development of drilling plans, design of the placement of wells, the estimation of hydrocarbon production, and/or the like. In particular, the identification of open fractures in a region of interest may encourage the placement of wells proximate to such fractures in order to improve hydrocarbon production. The identification of open fractures may also lead to the identification of passed hydrocarbons and better well trajectory planning for horizontal and deviated wells. In addition, the identification of closed fractures in the region of interest and any associated flow barriers may assist with reservoir compartmentalization analysis. Without the ability to identify fractures as either open or closed, predictions of hydrocarbon production for the region of interest may be overestimated.

In some implementations, a method for determining a fracture type using stress analysis may be provided. The method may include receiving seismic data acquired in a seismic survey of a region of interest. The method may also include performing a kinematic analysis on the seismic data. The method may further include generating one or more fracture planes from the seismic data based on the kinematic analysis. The method may additionally include generating a mechanical earth model based on the seismic data. The method may further include performing a critical stress analysis on the one or more fracture planes based on the mechanical earth model. The method may also include determining a fracture type of respective fractures in the one or more fracture planes based on the critical stress analysis.

In some implementations, performing the critical stress analysis may include calculating a shear stress and a normal stress acting on the respective fractures in the one or more fracture planes based on the mechanical earth model, and may include determining whether the respective fractures are critically stressed, where the respective fractures are critically stressed if the shear stress is greater than the normal stress. Determining the fracture type of the respective fractures may include determining that the respective fractures are open fractures if critically stressed, and may include determining that the respective fractures are closed fractures if not critically stressed. The method may also include determining whether the respective fractures are open fractures or closed fractures based on the critical stress analysis, and may include filtering the one or more fracture planes to remove the closed fractures. Performing the kinematic analysis may include generating a kinematic model, where the kinematic model indicates one or more areas of the region of interest having a higher potential of having fractures than other areas of the region of interest. Generating the one or more fractures planes may include generating ant track data from the seismic data using an ant track algorithm, may include extracting the one or more fracture planes from the ant track data, and may include generating the one or more extracted fracture planes if the one or more extracted fracture planes match the kinematic model. The one or more extracted fracture planes may match the kinematic model if a predetermined number of fractures of the extracted fracture planes are positioned in the areas of the region of interest having the higher potential of having fractures indicated by the kinematic model. The method may also include deriving one or more geomechanical properties of the region of interest from the mechanical earth model, and may include performing the critical stress analysis on the one or more fracture planes based on the one or more geomechanical properties. The one or more geomechanical properties may be selected from a group consisting of one or more rock properties, one or more elastic properties, and one or more stress properties. The seismic data may include a three-dimensional seismic volume. The method may also include attenuating noise in the seismic data.

In some implementations, an information processing apparatus for use in a computing system is provided, and includes means for receiving seismic data acquired in a seismic survey of a region of interest. The information processing apparatus may also have means for performing a kinematic analysis on the seismic data. The information processing apparatus may also have means for generating one or more fracture planes from the seismic data based on the kinematic analysis. The information processing apparatus may also have means for generating a mechanical earth model based on the seismic data. The information processing apparatus may also have means for performing a critical stress analysis on the one or more fracture planes based on the mechanical earth model. The information processing apparatus may also have means for determining a fracture type of respective fractures in the one or more fracture planes based on the critical stress analysis.

In some implementations, a computing system is provided that includes at least one processor, at least one memory, and one or more programs stored in the at least one memory, wherein the programs include instructions, which when executed by the at least one processor cause the computing system to receive seismic data acquired in a seismic survey of a region of interest. The programs may further include instructions to cause the computing system to perform a kinematic analysis on the seismic data. The programs may further include instructions to cause the computing system to generate one or more fracture planes from the seismic data based on the kinematic analysis. The programs may further include instructions to cause the computing system to generate a mechanical earth model based on the seismic data. The programs may further include instructions to cause the computing system to perform a critical stress analysis on the one or more fracture planes based on the mechanical earth model. The programs may further include instructions to cause the computing system to determine a fracture type of respective fractures in the one or more fracture planes based on the critical stress analysis.

In some implementations, a computer readable storage medium is provided, which has stored therein one or more programs, the one or more programs including instructions, which when executed by a processor, cause the processor to receive seismic data acquired in a seismic survey of a region of interest. The programs may further include instructions, which cause the processor to perform a kinematic analysis on the seismic data. The programs may further include instructions, which cause the processor to generate one or more fracture planes from the seismic data based on the kinematic analysis. The programs may further include instructions, which cause the processor to generate a mechanical earth model based on the seismic data. The programs may further include instructions, which cause the processor to perform a critical stress analysis on the one or more fracture planes based on the mechanical earth model. The programs may further include instructions, which cause the processor to determine a fracture type of respective fractures in the one or more fracture planes based on the critical stress analysis.

Computing Systems

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, smart watches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 7:
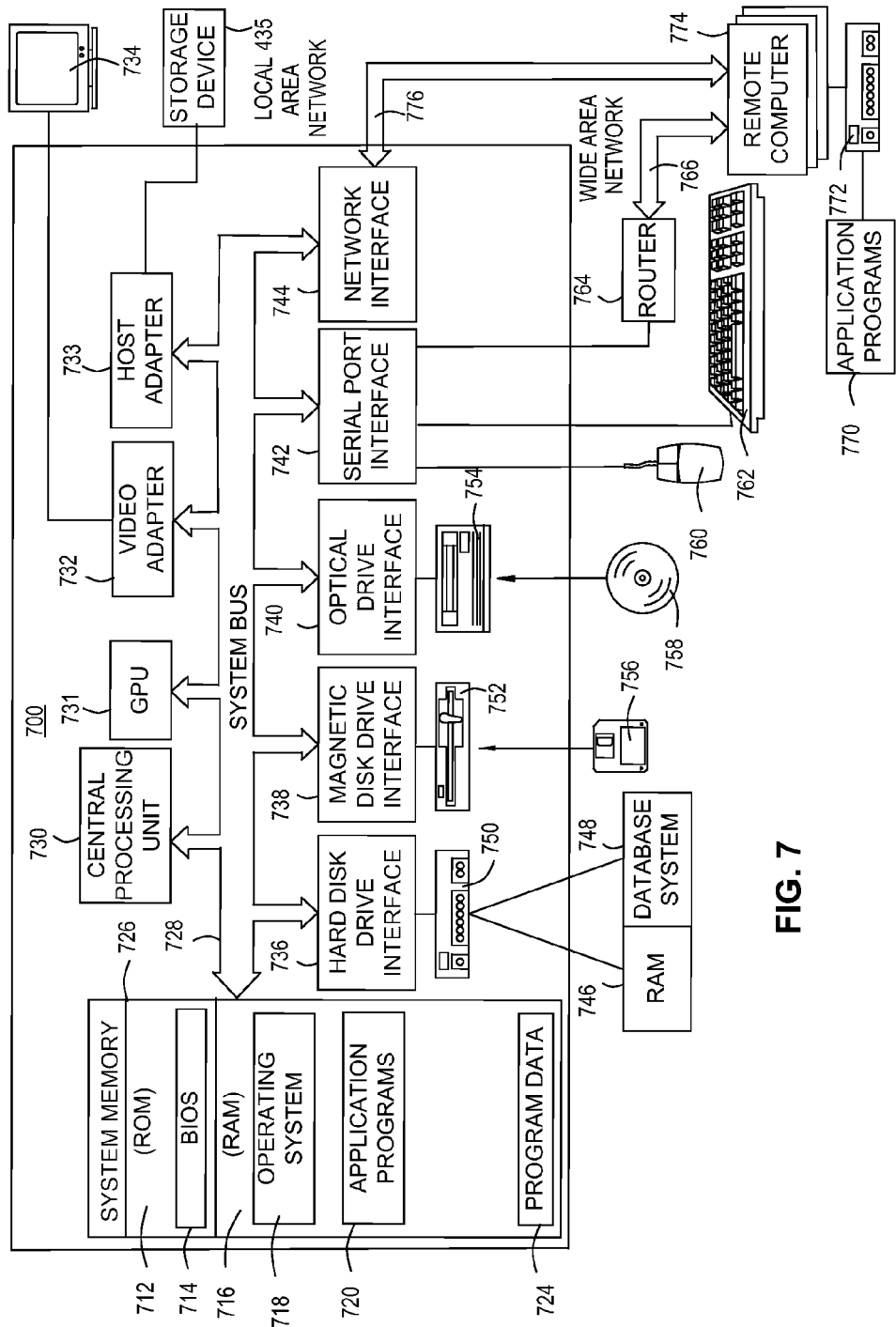
FIG. 7 illustrates a schematic diagram of a computing system in which the various technologies described herein may be incorporated and practiced.

FIG. 7 illustrates a schematic diagram of a computing system 700 in which the various technologies described herein may be incorporated and practiced. Although the computing system 700 may be a conventional desktop or a server computer, as described above, other computer system configurations may be used.

The computing system 700 may include a central processing unit (CPU) 730, a system memory 726, a graphics processing unit (GPU) 731 and a system bus 728 that couples various system components including the system memory 726 to the CPU 730. Although one CPU is illustrated in FIG. 7, it should be understood that in some implementations the computing system 700 may include more than one CPU. The GPU 731 may be a microprocessor specifically designed to manipulate and implement computer graphics. The CPU 730 may offload work to the GPU 731. The GPU 731 may have its own graphics memory, and/or may have access to a portion of the system memory 726. As with the CPU 730, the GPU 731 may include one or more processing units, and the processing units may include one or more cores. The system bus 728 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 726 may include a read-only memory (ROM) 712 and a random access memory (RAM) 746. A basic input/output system (BIOS) 714, containing the basic routines that help transfer information between elements within the computing system 700, such as during start-up, may be stored in the ROM 712.

The computing system 700 may further include a hard disk drive 750 for reading from and writing to a hard disk, a magnetic disk drive 752 for reading from and writing to a removable magnetic disk 756, and an optical disk drive 754 for reading from and writing to a removable optical disk 758, such as a CD ROM or other optical media. The hard disk drive 750, the magnetic disk drive 752, and the optical disk drive 754 may be connected to the system bus 728 by a hard disk drive interface 756, a magnetic disk drive interface 758, and an optical drive interface 750, respectively. The drives and their associated computer-readable media may provide nonvolatile storage of computer-readable instructions, data structures, program modules and other data for the computing system 700.

Although the computing system 700 is described herein as having a hard disk, a removable magnetic disk 756 and a removable optical disk 758, it should be appreciated by those skilled in the art that the computing system 700 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 700. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 700 may also include a host adapter 733 that connects to a storage device 735 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 750, magnetic disk 756, optical disk 758, ROM 712 or RAM 716, including an operating system 718, one or more application programs 720, program data 724, and a database system 748. The application programs 720 may include various mobile applications ("apps") and other applications configured to perform various methods and techniques described herein. The operating system 718 may be any suitable operating system that may control the operation of a networked personal or server computer, such as Windows® XP, Mac OS® X, Unix-variants (e.g., Linux® and BSD®), and the like.

A user may enter commands and information into the computing system 700 through input devices such as a keyboard 762 and pointing device 760. Other input devices may include a microphone, joystick, game pad, satellite dish, scanner, or the like. These and other input devices may be connected to the CPU 730 through a serial port interface 742 coupled to system bus 728, but may be connected by other interfaces, such as a parallel port, game port or a universal serial bus (USB). A monitor 734 or other type of display device may also be connected to system bus 728 via an interface, such as a video adapter 732. In addition to the monitor 734, the computing system 700 may further include other peripheral output devices such as speakers and printers.

Further, the computing system 700 may operate in a networked environment using logical connections to one or more remote computers 774. The logical connections may be any connection that is commonplace in offices, enterprise-wide computer networks, intranets, and the Internet, such as local area network (LAN) 756 and a wide area network (WAN) 766. The remote computers 774 may be another a computer, a server computer, a router, a network PC, a peer device or other common network node, and may include many of the elements describes above relative to the computing system 700. The remote computers 774 may also each include application programs 770 similar to that of the computer action function.

When using a LAN networking environment, the computing system 700 may be connected to the local network 776 through a network interface or adapter 744. When used in a WAN networking environment, the computing system 700 may include a router 764, wireless router or other means for establishing communication over a wide area network 766, such as the Internet. The router 764, which may be internal or external, may be connected to the system bus 728 via the serial port interface 752. In a networked environment, program modules depicted relative to the computing system 700, or portions thereof, may be stored in a remote memory storage device 772. It will be appreciated that the network connections shown are merely examples and other means of establishing a communications link between the computers may be used.

The network interface 744 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 774.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, on the user's computing device, as a stand-alone software package, on the user's computer and on a remote computer or entirely on the remote computer or a server computer.

The system computer 700 may be located at a data center remote from the survey region. The system computer 700 may be in communication with the receivers (either directly or via a recording unit, not shown), to receive signals indicative of the reflected seismic energy. These signals, after conventional formatting and other initial processing, may be stored by the system computer 700 as digital data in the disk storage for subsequent retrieval and processing in the manner described above. In one implementation, these signals and data may be sent to the system computer 700 directly from sensors, such as geophones, hydrophones and the like. When receiving data directly from the sensors, the system computer 700 may be described as part of an in-field data processing system. In another implementation, the system computer 700 may process seismic data already stored in the disk storage. When processing data stored in the disk storage, the system computer 700 may be described as part of a remote data processing center, separate from data acquisition. The system computer 700 may be configured to process data as part of the in-field data processing system, the remote data processing system or a combination thereof.

Those with skill in the art will appreciate that any of the listed architectures, features or standards discussed above with respect to the example computing system 700 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method, comprising:
   receiving seismic data acquired in a seismic survey of a region of interest;
   performing a kinematic analysis on the seismic data;
   generating one or more fracture planes from the seismic data based on the kinematic analysis;
   generating a mechanical earth model based on the seismic data;
   performing a critical stress analysis on the one or more fracture planes based on the mechanical earth model; and
   determining a fracture type of respective fractures in the one or more fracture planes based on the critical stress analysis.

2. The method of claim 1, wherein performing the critical stress analysis comprises:
   calculating a shear stress and a normal stress acting on the respective fractures in the one or more fracture planes based on the mechanical earth model; and
   determining whether the respective fractures are critically stressed, wherein the respective fractures are critically stressed if the shear stress is greater than the normal stress.

3. The method of claim 2, wherein determining the fracture type of the respective fractures comprises:
   determining that the respective fractures are open fractures if critically stressed; and
   determining that the respective fractures are closed fractures if not critically stressed.

4. The method of claim 1, further comprising:
   determining whether the respective fractures are open fractures or closed fractures based on the critical stress analysis; and
   filtering the one or more fracture planes to remove the closed fractures.

5. The method of claim 1, wherein performing the kinematic analysis comprises generating a kinematic model, wherein the kinematic model indicates one or more areas of the region of interest having a higher potential of having fractures than other areas of the region of interest.

6. The method of claim 5, wherein generating the one or more fractures planes comprises:
   generating ant track data from the seismic data using an ant track algorithm;
   extracting the one or more fracture planes from the ant track data; and
   generating the one or more extracted fracture planes if the one or more extracted fracture planes match the kinematic model.

7. The method of claim 6, wherein the one or more extracted fracture planes match the kinematic model if a predetermined number of fractures of the extracted fracture planes are positioned in the areas of the region of interest having the higher potential of having fractures indicated by the kinematic model.

8. The method of claim 1, further comprising:
   deriving one or more geomechanical properties of the region of interest from the mechanical earth model; and
   performing the critical stress analysis on the one or more fracture planes based on the one or more geomechanical properties.

9. The method of claim 8, wherein the one or more geomechanical properties are selected from a group consisting of:
   one or more rock properties;
   one or more elastic properties; and
   one or more stress properties.

10. The method of claim 1, wherein the seismic data comprise a three-dimensional seismic volume.

11. The method of claim 1, further comprising attenuating noise in the seismic data.

12. A non-transitory computer-readable medium having stored thereon a plurality of computer-executable instructions which, when executed by a computer, cause the computer to:
   receive seismic data acquired in a seismic survey of a region of interest;
   perform a kinematic analysis on the seismic data;
   generate one or more fracture planes from the seismic data based on the kinematic analysis;
   generate a mechanical earth model based on the seismic data;
   perform a critical stress analysis on the one or more fracture planes based on the mechanical earth model; and
   determine a fracture type of respective fractures in the one or more fracture planes based on the critical stress analysis.

13. The non-transitory computer-readable medium of claim 12, wherein the computer-executable instructions which, when executed by a computer, cause the computer to perform the critical stress analysis, further comprise computer-executable instructions which, when executed by the computer, cause the computer to:
   calculate a shear stress and a normal stress acting on the respective fractures in the one or more fracture plane based on the mechanical earth model; and determine whether the respective fractures are critically stressed, wherein the respective fractures are critically stressed if the shear stress is greater than the normal stress.

14. The non-transitory computer-readable medium of claim 13, wherein the computer-executable instructions which, when executed by a computer, cause the computer to determine the fracture type of the respective fractures, further comprise computer-executable instructions which, when executed by the computer, cause the computer to:
   determine that the respective fractures are open fractures if critically stressed; and
   determine that the respective fractures are closed fractures if not critically stressed.

15. The non-transitory computer-readable medium of claim 12, wherein the computer-executable instructions which, when executed by a computer, cause the computer to perform the kinematic analysis, further comprise computer-executable instructions which, when executed by the computer, cause the computer to generate a kinematic model, wherein the kinematic model indicates one or more areas of the region of interest having a higher potential of having fractures than other areas of the region of interest.

16. The non-transitory computer-readable medium of claim 15, wherein the computer-executable instructions which, when executed by a computer, cause the computer to generate the one or more fractures planes, further comprise computer-executable instructions which, when executed by the computer, cause the computer to:
   generate ant track data from the seismic data using an ant track algorithm;
   extract the one or more fracture planes from the ant track data; and
   generate the one or more extracted fracture planes if the one or more extracted fracture planes match the kinematic model.

17. The non-transitory computer-readable medium of claim 16, wherein the one or more extracted fracture planes match the kinematic model if a predetermined number of fractures of the extracted fracture planes are positioned in the areas of the region of interest having the higher potential of having fractures indicated by the kinematic model.

18. A computer system, comprising:
a processor; and
a memory comprising a plurality of program instructions which, when executed by the processor, cause the processor to:
   receive seismic data acquired in a seismic survey of a region of interest;
   perform a kinematic analysis on the seismic data;
   generate one or more fracture planes from the seismic data based on the kinematic analysis;
   generate a mechanical earth model based on the seismic data;
   perform a critical stress analysis on the one or more fracture planes based on the mechanical earth model; and
   determine a fracture type of respective fractures in the one or more fracture planes based on the critical stress analysis.

19. The computer system of claim 18, wherein the program instructions which, when executed by the processor, cause the processor to perform the critical stress analysis, further comprise program instructions which, when executed by the processor, cause the processor to:
   calculate a shear stress and a normal stress acting on the respective fractures in the one or more fracture plane based on the mechanical earth model; and
   determine whether the respective fractures are critically stressed, wherein the respective fractures are critically stressed if the shear stress is greater than the normal stress.

20. The computer system of claim 19, wherein the program instructions which, when executed by the processor, cause the processor to determine the fracture type of the respective fractures, further comprise program instructions which, when executed by the processor, cause the processor to:
   determine that the respective fractures are open fractures if critically stressed; and
   determine that the respective fractures are closed fractures if not critically stressed.

* * * * *